(12) United States Patent
Kawachi

(10) Patent No.: US 7,830,421 B2
(45) Date of Patent: Nov. 9, 2010

(54) REPRODUCING APPARATUS

(75) Inventor: Shuhei Kawachi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 11/828,570

(22) Filed: Jul. 26, 2007

(65) Prior Publication Data
US 2008/0031547 A1 Feb. 7, 2008

(30) Foreign Application Priority Data
Aug. 1, 2006 (JP) .............................. 2006-210174

(51) Int. Cl.
  H04N 5/76 (2006.01)
  G11B 27/00 (2006.01)
  G06K 9/54 (2006.01)
(52) U.S. Cl. ................. 348/231.2; 386/55; 382/305
(58) Field of Classification Search ............. 348/220.1, 348/231.1–231.3, 231.8, 211.99; 382/305; 386/55
See application file for complete search history.

(56) References Cited

U.S. PATENT DOCUMENTS

| | | | |
|---|---|---|---|
| 6,970,192 B2 * | 11/2005 | Takayama | 348/231.2 |
| 7,236,684 B2 * | 6/2007 | Kawakami et al. | 386/52 |
| 7,342,604 B2 * | 3/2008 | Kito et al. | 348/231.2 |
| 7,609,896 B2 * | 10/2009 | Shiina | 382/232 |
| 7,616,235 B2 * | 11/2009 | Shibuya et al. | 348/231.2 |
| 7,639,300 B2 * | 12/2009 | Yumiki | 348/333.12 |
| 2001/0005434 A1 | 6/2001 | Noguchi et al. | |
| 2003/0229894 A1 * | 12/2003 | Okada et al. | 725/41 |
| 2004/0109673 A1 * | 6/2004 | Yatabe et al. | 386/69 |
| 2005/0002655 A1 * | 1/2005 | Noguchi et al. | 386/126 |

FOREIGN PATENT DOCUMENTS

JP 2001-189915 A 7/2001

* cited by examiner

Primary Examiner—Lin Ye
Assistant Examiner—Trung Diep
(74) Attorney, Agent, or Firm—Canon U.S.A. Inc., I.P Division

(57) ABSTRACT

An apparatus reproduces moving image data from a recording medium on which moving image data of a plurality of scenes are recorded. The apparatus includes a memory to store a plurality of representative image data representing representative images of the plurality of scenes. The apparatus generates a list screen for the representative images using the representative image data stored on the memory and displays the generated list screen on a display device. The apparatus controls the reproduction of moving image data recorded on the recording medium according to a user instruction, generates representative image data based on the reproduced moving image data and stores the generated representative image data on the memory.

11 Claims, 6 Drawing Sheets

REPRODUCING APPARATUS

BACKGROUND OF THE INVENTION

1. Field of the Invention

The present invention relates to a reproducing apparatus. More specifically, the present invention relates to a reproducing apparatus (e.g., video camera) capable of displaying a representative image of a moving image recorded on a recording medium (e.g., DVD).

2. Description of the Related Art

In recent years, a video camera has been marketed that can record moving image data and audio data on an optical disk, such as a digital versatile disc (DVD), and reproduce the data recorded on the optical disk. Such a disk video camera, in reproducing a taken image, generally displays a list of representative images of recorded scenes and allows a user to select a desired scene from among the representative images displayed as a list to reproduce the desired scene.

In displaying a representative image, it may be necessary to reproduce a representative image of each scene from an area of a disk on which representative images of respective scenes are recorded. Accordingly, a considerably long time may be required until a screen showing a list of representative images is displayed. In particular, when a user repeatedly starts and stops reproduction, a list of representative images is displayed according to each operation. Thus, user convenience can degrade.

Japanese Patent Application Laid-Open No. 2001-189915 (corresponding to U.S. Patent Application Publication No. US 2001/0005434 A1) discusses a method in which a buffer memory for storing representative images is provided to reduce a time taken for displaying a representative image.

In addition, Japanese Patent Application Laid-Open No. 2001-189915 also discusses a method for reducing a time taken to access a disk in acquiring a representative image by using a file including representative images and recording the file on continuous areas on a disk. However, in DVD-Video format, a method for storing representative images as a separate file is not regulated. Thus, a compatibility issue may exist between apparatuses if different DVD-video formats are utilized.

Now, an example of an operation for displaying a list of representative images in a conventional disk video camera will be described below.

When a reproduction mode of a video camera starts, the video camera displays a list of representative images of respective scenes recorded on a disk, as illustrated in a screen 301 in FIG. 3. When a user selects the fifth scene and generates an instruction for reproducing the selected scene, the video camera reproduces a moving image of the selected scene. Then, as illustrated in step 302, the video camera changes a display on the screen from a list of representative images to images in the reproduced scene.

When the reproduction is continued, subsequent sixth, seventh, and eighth scenes are serially reproduced after the fifth scene. When the reproduction is further continued and the user generates an instruction for stopping the reproduction in the middle of reproduction of the tenth scene, the video camera returns the display on the screen to a list of representative images.

At this time, representative images of the seventh through twelfth scenes are reproduced as a list, as illustrated in a screen 303 in FIG. 3. Furthermore, a representative image of the tenth scene, which has been reproduced up to the middle thereof, is selected in the screen 303. Because the representative images of the seventh through twelfth scenes are not stored on a buffer memory, the video camera performs processing for generating representative images while accessing the disk.

As described above, in a conventional method in which representative images are stored on a buffer memory, in a case where representative images of scenes displayed when reproduction is stopped are not stored on the buffer memory, it is necessary to reproduce the representative images again. Accordingly, in this case also, a long time is required to display a representative image list screen.

SUMMARY OF THE INVENTION

An embodiment of the present invention is directed to a reproducing apparatus capable of displaying a list of representative images of chapters with a high response in reproducing a moving image recorded on a random access recording medium.

According to an aspect of the present invention, an apparatus includes a reproduction unit configured to reproduce moving image data from a recording medium on which moving image data of a plurality of scenes is recorded, a representative image memory configured to store a plurality of representative image data representing representative images of the plurality of scenes, a list screen generation unit configured to generate a list screen for the representative images of the plurality of scenes using the representative image data stored on the representative image memory and to display the generated list screen on a display device, an instruction unit configured to generate an instruction for selecting one representative image from a plurality of representative images displayed on the list screen and for starting reproduction, a control unit configured to control the reproduction unit to reproduce moving image data from the recording medium according to the instruction generated by the instruction unit, and a representative image generation unit configured to generate the representative image data using the moving image data reproduced according to the instruction generated by the instruction unit and to store the generated representative image data on the representative image memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Now, an exemplary embodiment of the present invention will be described below. An exemplary embodiment of the present invention can be applied to a reproducing apparatus (e.g., video camera, video player, DVD player, computer, etc.) capable of reproducing moving image data recording on a recording medium (e.g., DVD). In particular, an embodiment of the present invention can be applied to a disk video camera capable of recording moving image data and audio data on a DVD and reproducing the recorded data.

In a DVD video camera, DVD-Video format and DVD Video Recording (VR) format are commonly used in recording stream data of a moving image on a recording medium, such as a DVD-recordable (DVD-R) and a DVD-rewritable (DVD-RW).

The DVD-Video format has been originally proposed for a DVD-read-only memory (DVD-ROM), which can be reproduced only. Accordingly, data recorded according to the DVD-Video format cannot be edited after recording, but can be reproduced by various DVD video players, which are widely marketed and used. The DVD VR format has been proposed on the premise that stream data is recorded in real time and the recorded data can be edited later. Accordingly, the degree of freedom in the case of using the DVD VR format is high. However, data recorded according to the DVD VR format cannot be reproduced by most DVD video players.

The DVD-Video format employs a Universal Disc Format (UDF) bridge as a file system. The UDF bridge is intended to provide both access methods of UDF Version 1.02 and International Organization for Standardization (ISO)-9660, which are logical formats proposed on the premise of use in a read-only (write-once) disk. Thus, according to the DVD-Video format, which corresponds to the ISO-9660 that has been widely used as a logical format for a compact disc-read-only memory (CD-ROM), even an apparatus that does not correspond to the UDF can access a DVD.

Figure 2:
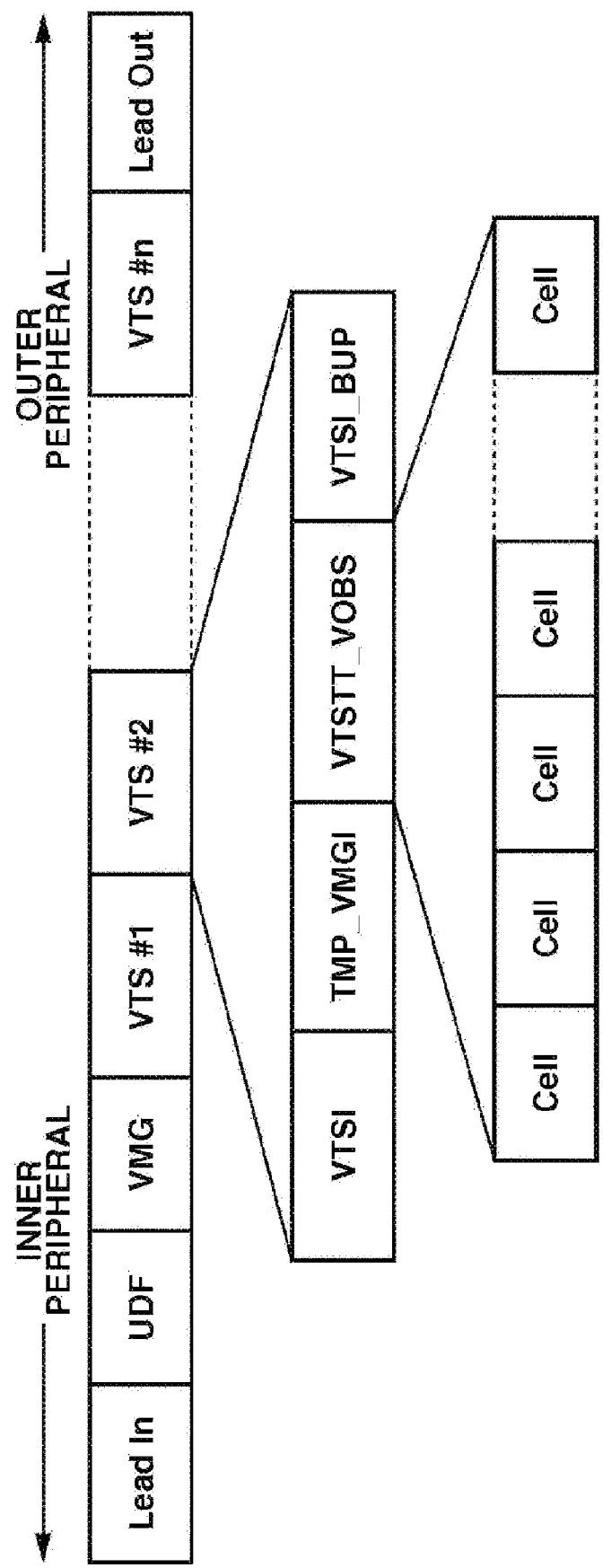
FIG. 2 illustrates a data structure of a disk on which DVD-Video format data is recorded according to an exemplary embodiment of the present invention.

FIG. 2 illustrates a data structure of a disk on which DVD-Video format data is recorded. Referring to FIG. 2, the DVD-Video format data includes a "lead in", a file system (UDF bridge), a "Video Manager" (VMG), a "Video Title Set" (VTS), and a "lead out" in order from the inner peripheral of the disk.

The VMG stores information about a menu screen, such as a screen displaying a list of contents of taken images. The VTS includes Video Title Set Information (VTSI), Temporary Video Manager Information (TMP_VMGI), a Video Object Set for Title (VTSTT_VOBS), and a Video Title Set Information Backup (VTSI_BUP). The VTSI includes control information for reproducing stream data stored in the VTS. The control information includes information such as a program (PG) (equivalent to a unit of REC/REC Pause).

The TMP_VMGI includes a temporary VMG for contents recorded so far, in order to reproduce a content even in a state before finalization in which no file system area exists. The VTSTT_VOBS includes a Video Object Unit (VOBU), which is stream data. The VTSI_BUP is a backup of the VTSI and includes the same data as that in the VTSI.

The "lead in", the "lead out", the file system, and the VMG are generated after finalization is performed. After a file system is generated by finalization, the disk can be reproduced by a common DVD player. Here, a write-once medium, such as a DVD-R, no data can be overwritten once a file system is generated by finalization. Accordingly, no data can be written on the write-once medium after a file system has been generated even if a free space exists on the disk.

Video data and audio data is compressed, encoded, and multiplexed, and is then recorded on a disk as stream data (VTSTT_VOBS). At this time, the video data and audio data is temporarily stored on a built-in buffer memory, and when a specific sufficient amount of data is stored, the stored data is written on the disk. A unit of writing in this case is referred to as a "cell".

The VTSI, the TMP_VMGI, and the VTSI_BUP are not finally generated until all stream data in the VTS is taken. Thus, in the case of using a write-once medium, such as a DVD-R, information, such as the VTSI, the TMP_VMGI, and the VTSI_BUP, cannot be written on a disk at the time of writing of stream data in the unit of a cell. Accordingly, information about PG information in the VTSI, which includes a first cell number and a last cell number, and information generated at the time of writing the data for each cell are stored on a built-in memory.

In segmenting the VTS, a VTSI, a VTSTT_VOBS, and a VTSI_BUP are generated according to the information stored on the built-in memory, and resulting data is written on a disk.

When data is recorded in a file system area generated by finalization, each data recorded on the disk can be accessed as a file via the file system. The DVD-Video format regulates requisites for a file structure.

As described above, information about a menu screen for displaying a list of representative images is recorded in the VMGI. However, no VMGI exists on a disk that is yet to be finalized. Here, information for generating a VMGI is stored in the TMP_VMGI in the VTS. However, the TMP_VMGI does not include data for a menu screen itself.

In this case, a representative image is generated by acquiring a list of recorded chapters according to information in the TMP_VMGI, reading moving image data of each chapter, and using the reproduced moving image data.

In an ordinary case, a DVD video camera separately displays a list of representative images without using a VMGI even when a disk inserted in the DVD video camera has already been finalized. In the case of using the DVD-Video format, according to which recorded moving image data is Moving Picture Experts Group (MPEG)-coded, an "I" picture, which is the first image of a specific chapter, is used as a representative image in most cases.

Figure 1:
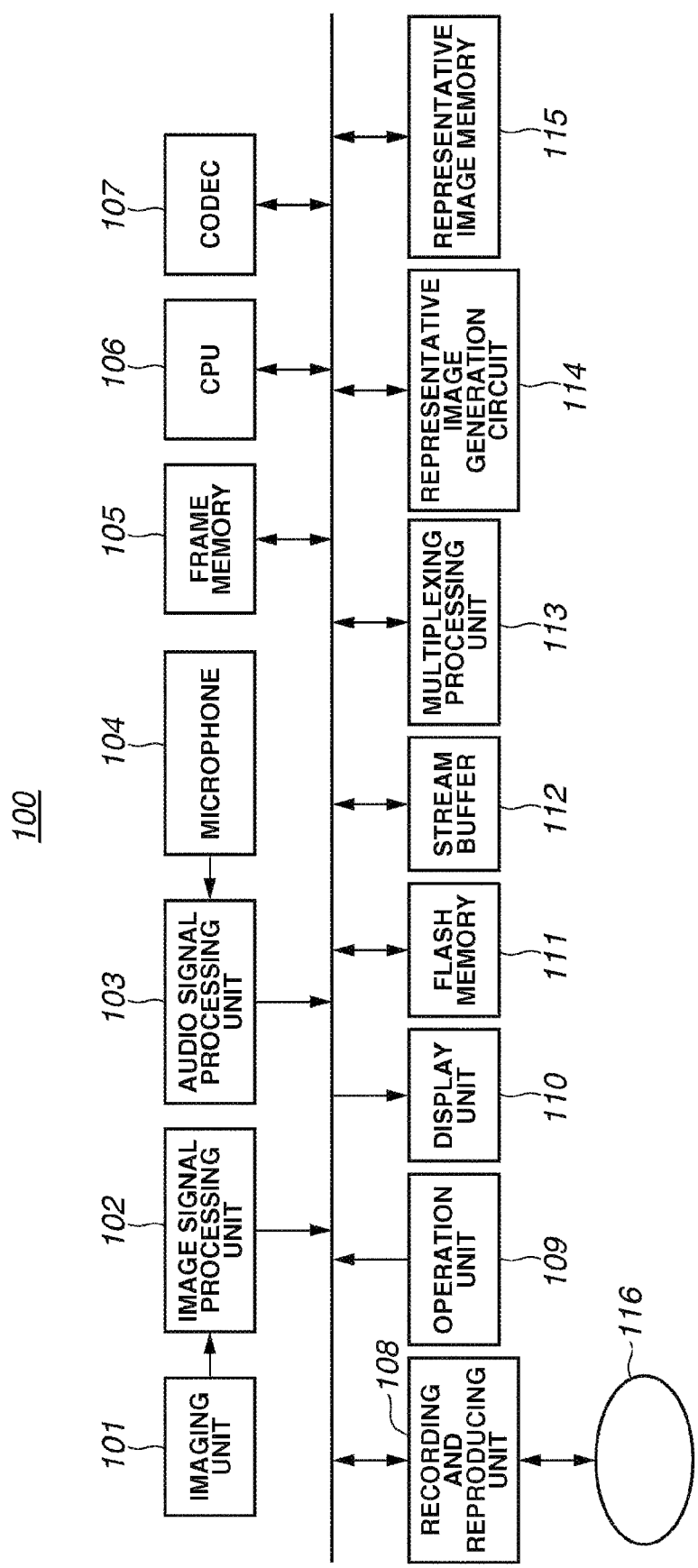
FIG. 1 illustrates an exemplary configuration of a video camera according to an exemplary embodiment of the present invention.

FIG. 1 illustrates an exemplary configuration of a DVD video camera 100 according to an exemplary embodiment. The DVD video camera 100 records moving image data and audio data on a recording medium, such as a DVD-R or a DVD-RW, and reproduces the recorded data according to the DVD-Video format.

Referring to FIG. 1, an imaging unit 101 converts an object image and sound into an electrical signal. The imaging unit 101 has a function for shooting a moving image and a still image.

An image signal processing unit 102 performs analog/digital (A/D) conversion and appropriate image processing on a image signal obtained by the imaging unit 101.

A microphone 104 externally captures sound. An audio signal processing unit 103 performs A/D conversion and appropriate signal processing on an audio signal obtained by the microphone 104.

A frame memory 105, when the DVD video camera 100 is in a recording mode, stores the image data and the audio data captured by shooting until the data is encoded and multiplexed, and when the DVD video camera 100 is in a reproduction mode, stores demultiplexed and decoded image data and audio data until the demultiplexed and decoded data is output. A central processing unit (CPU) 106 controls an operation of each component of the DVD video camera 100.

A coder-decoder (codec) 107, when the DVD video camera 100 is in the recording mode, compresses and encodes image data and audio data, and when the DVD video camera 100 is in the reproduction mode, decodes the reproduced image data and audio data to expand an amount of information.

A recording and reproducing unit 108 writes and reads various data on and from a disk 116. The recording and reproducing unit 108 includes a disk drive and a laser pickup.

An operation unit 109 includes various switches, such as a power switch, a mode switch, a recording switch, and a reproduction switch. A user can operate the DVD video camera 100 by operating the operation unit 109.

A display unit 110 includes a liquid crystal panel. When the DVD video camera 100 is in the recording mode, the display unit 110 displays an image acquired by the imaging unit 101, and when the DVD video camera 100 is in the reproduction mode, displays a reproduced image read from the disk 116. Furthermore, the display unit 110 has a function for displaying a menu for performing a setting for the DVD video camera 100 and various information, such as a representative image list screen, which will be described later below.

A flash memory 111 stores information that needs to be retained when the DVD video camera 100 is powered off, of information that cannot be written to the disk 116 when the DVD video camera 100 is in the recording mode. In addition, the flash memory 111 stores information necessary for restoring to a shootable state when a battery (not shown) is removed during shooting.

A stream buffer 112 stores multiplexed stream data. A multiplexing processing unit 113 multiplexes compressed and encoded image data and audio data to generate stream data when the DVD video camera 100 is in the recording mode. When the DVD video camera 100 is in the reproduction mode, the multiplexing processing unit 113 demultiplexes image data, audio data, and various additional information from the stream data read and reproduced from the disk 116.

A representative image generation circuit 114 generates a representative image using data for one picture in the moving image data read and reproduced from the disk 116 and stores the generated representative image on a representative image memory 115. More specifically, in an embodiment, the representative image generation circuit 114 reduces the size of a first frame of each decoded chapter and stores the reduced image data as a representative image data on the representative image memory 115.

In addition, the representative image generation circuit 114 generates data for a representative image list screen using the representative image data stored on the representative image memory 115, and then sends the generated data for a representative image list screen to the display unit 110. Processing for generating the data for a representative image list screen will be described later below.

The representative image memory 115 stores representative image data of each chapter (scene). Representative image data of each chapter and a chapter number are associated with each other to be stored on the representative image memory 115. The disk 116 is a recordable medium, such as a DVD-R and a DVD-RW. A moving image and audio data are recorded on and reproduced from the disk 116.

When the user generates an instruction for starting recording via the operation unit 109 when the DVD video camera 100 is in a shooting mode, an electrical signal acquired by the imaging unit 101 is converted into digital data by the image signal processing unit 102, and then the converted digital data is stored on the frame memory 105. Audio signal captured by the microphone 104 at the same time is converted into digital data by the audio signal processing unit 103, and then the converted digital data is stored on the frame memory 105.

The image data and audio data stored on the frame memory 105 is compressed by the codec 107. Then, the compressed data is multiplexed with various additional information by the multiplexing processing unit 113 to generate stream data. The stream data is stored on the stream buffer 112. The stream buffer 112 has a capacity large enough to store one cell of stream data.

When one cell of stream data is stored, the recording and reproducing unit 108 reads the stored stream data from the stream buffer 112 and writes the read stream data on the disk 116. Furthermore, the recording and reproducing unit 108 writes cell information about the written stream data on the flash memory 111. In segmenting a VTS, the recording and reproducing unit 108 generates management data, such as VTSI, according to cell information or PG information, and writes the generated management data on the disk 116.

When shooting is continued and the user generates an instruction for stopping recording via the operation unit 109, the recording and reproducing unit 108 stops recording stream data on the disk 116. In an exemplary embodiment, stream data of a series of scenes recorded on the disk 116 during a time period from an instruction for starting recording to an instruction for stopping the recording is managed as one chapter.

In reproducing stream data from the disk 116, the stream data reproduced by the recording and reproducing unit 108 from the disk 116 is stored on the stream buffer 112.

The multiplexing processing unit 113 reads the stream data from the stream buffer 112, demultiplexes the read stream data into moving image data and audio data, and then stores the demultiplexed moving image data and audio data on the frame memory 105.

The moving image data and audio data stored on the frame memory 105 is decoded by the codec 107. Then, the image signal processing unit 102 and the audio signal processing unit 103 respectively performs appropriate signal processing on the decoded moving image data and audio data. Subsequently, the signal-processed moving image data and audio data is respectively output on the liquid crystal panel of the display unit 110 or from a speaker (not shown).

When the user generates an instruction for finalization via the operation unit 109, the CPU 106, if the VTS has not been closed yet, closes the VTS, and generates a VMG (menu) according to the TMP_VMGI. Then, the CPU 106 generates a file system and writes the generated file system on the disk 116.

Now, processing on a representative image performed when the DVD video camera 100 is in the reproduction mode according to an exemplary embodiment will be described below.

First, processing for displaying a representative image list screen, selecting a scene desired to be reproduced, and generating an instruction for reproducing the selected scene will be described below with reference to FIG. 4. In an exemplary embodiment, the representative image memory 115 can store representative image data for twenty images. A representative image list screen can display six representative images.

Figure 4:
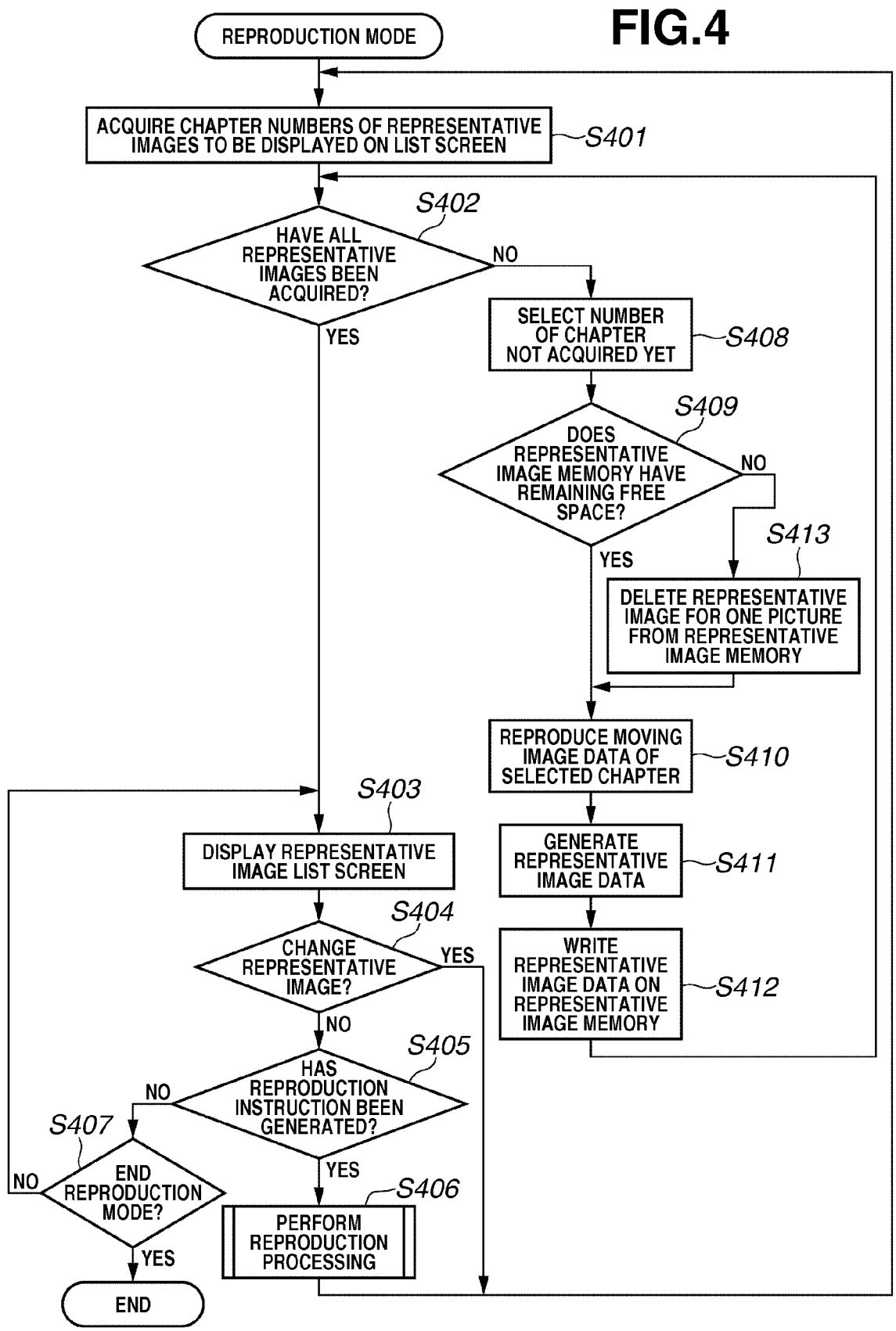
FIG. 4 is a flow chart illustrating reproduction processing according to an exemplary embodiment of the present invention.

The processing illustrated in FIG. 4 is performed by controlling each component of the DVD video camera 100 with the CPU 106.

Referring to FIG. 4, when a user operates the operation unit 109 to switch the DVD video camera 100 to the reproduction mode, in step S401, the CPU 106 acquires six chapter numbers of representative images to be displayed on the representative image list screen. When the representative image list screen is displayed for the first time after the DVD video camera 100 is powered on, representative images are displayed in the order from the first chapter. Here, the representative image list screen can be displayed when the user generates an instruction for displaying a list of representative images, as well as when a user operates the operation unit 109 to switch the DVD video camera 100 to the reproduction mode.

In step S402, the CPU 106 determines whether data of all the representative images of chapters having the chapter numbers acquired in step S401 is stored on the representative image memory 115.

Figure 3:
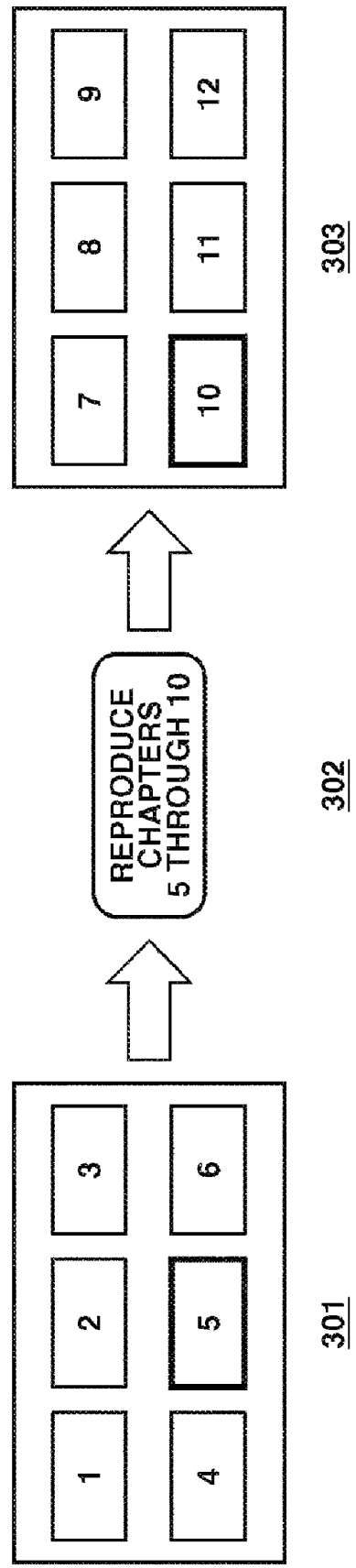
FIG. 3 illustrates an example of a representative image list screen and a state of reproduction using the representative image list screen.

If it is determined in step S402 that data of all the representative images of chapters having the chapter numbers acquired in step S401 is stored on the representative image memory 115 (YES in step S402), processing advances to step S403. In step S403, the CPU 106 generates a representative image list screen, such as the screen 301 illustrated in FIG. 3, with the representative image generation circuit 114, and displays the generated representative image list screen on the display unit 110.

In step S404, the CPU 106 determines whether the user has operated the operation unit 109 to generate an instruction for changing the representative image list screen. Here, the user can change the representative image list screen displayed on the display unit 110 to a screen displaying a list of representative images of chapters previous or subsequent to the chapters whose representative images are currently displayed.

More specifically, when the user generates an instruction for changing the screen displayed on the display unit 110 to a next representative image list screen in a state where the representative image list screen 301 (FIG. 3) is displayed, a representative image list screen 303 (FIG. 3) is displayed. The user can operate the operation unit 109 to select a representative image among those displayed on the representative image list screen and to generate an instruction for reproduction.

If it is determined in step S404 that the user has operated the operation unit 109 to generate an instruction for changing the representative image list screen (YES in step S404), then processing returns to step S401 to acquire chapter numbers of representative images to be newly displayed.

On the other hand, if it is determined in step S404 that the user has not operated the operation unit 109 to generate an instruction for changing the representative image list screen (NO in step S404), then processing advances to step S405. In step S405, the CPU 106 determines whether the user has operated the operation unit 109 to generate an instruction for reproduction.

If it is determined in step S405 that the user has operated the operation unit 109 to generate an instruction for reproduction (YES in step S405), then processing advances to step S406. In step S406, the CPU 106 performs reproduction processing, which will be described later below.

On the other hand, if it is determined in step S405 that the user has not operated the operation unit 109 to generate an instruction for reproduction (NO in step S405), then processing advances to step S407. In step S407, the CPU 106 determines whether the user has operated the operation unit 109 to generate an instruction for stopping the reproduction mode. If it is determined in step S407 that the user has not operated the operation unit 109 to generate an instruction for stopping the reproduction mode (that is, if the reproduction mode is to be continued) (NO in step S407), then processing returns to step S403. On the other hand, if it is determined in step S407 that the user has operated the operation unit 109 to generate an instruction for stopping the reproduction mode (YES in step S407), then the CPU 106 ends the processing.

If it is determined in step S402 that data of all the representative images of chapters having the chapter numbers acquired in step S401 is not stored on the representative image memory 115 (NO in step S402), then processing advances to step S408. In step S408, the CPU 106 acquires a chapter number of a representative image that is yet to be acquired (that is, not yet stored on the representative image memory 115), of the chapters to be displayed. In step S409, the CPU 106 determines whether a free space exists in the representative image memory 115.

If it is determined in step S409 that representative image data for twenty images is stored on the representative image memory 115 (NO in step S409), then processing advances to step S413. In step S413, the CPU 106 deletes representative image data of a chapter whose chapter number is most distant from the chapter number of the currently selected chapter with respect to the order of reproduction, of the representative images stored on the representative image memory 115, and then processing advances to step S410.

On the other hand, if it is determined in step S409 that a free space exists in the representative image memory 115 (YES in step S409), then processing advances to step S410. In step S410, the CPU 106 reproduces stream data of the selected chapter from the disk 116 and decodes a head portion of the reproduced moving image data. In step S411, the CPU 106 causes the representative image generation circuit 114 to generate representative image data using the first picture of the chapter from the decoded moving image data.

In an exemplary embodiment, moving image data is decoded and recorded according to an MPEG coding method. The representative image generation circuit 114 generates representative image data using an I picture of the first group of picture (GOP) of each chapter. The representative image data can also be generated by using a picture other than the first picture of each chapter.

In step S412, the CPU 106 stores the generated representative image data in a free space of the representative image memory 115 while associating the generated representative image data with the chapter number thereof. Then, processing returns to step S402.

Now, reproduction processing in step S406 will be described below.

Figure 5:
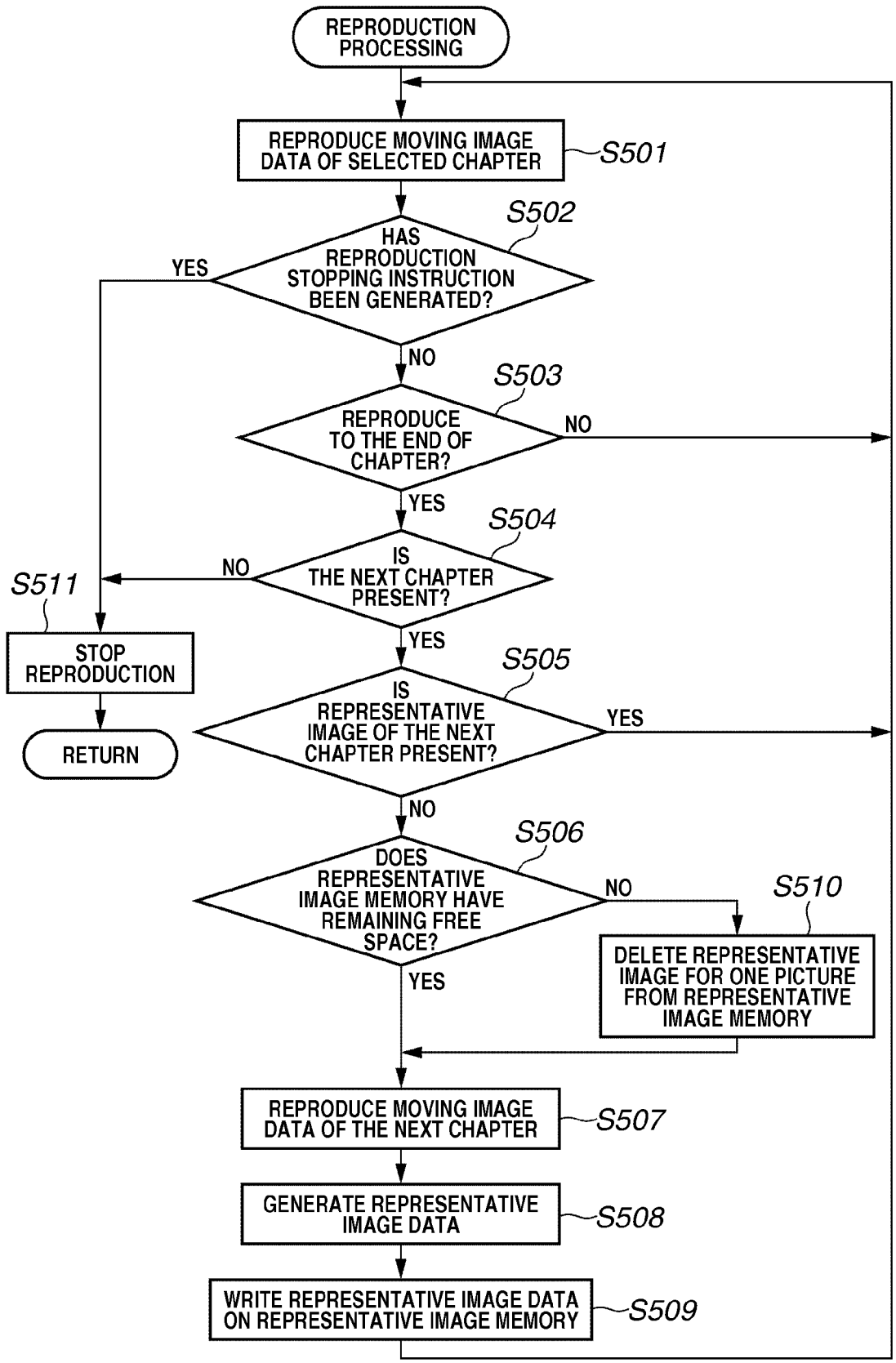
FIG. 5 is a flow chart illustrating reproduction processing according to an exemplary embodiment of the present invention.

FIG. 5 is a flow chart illustrating the reproduction processing in step S406. The processing illustrated in FIG. 5 is performed by controlling each component of the DVD video camera 100 with the CPU 106.

Referring to FIG. 5, when the user generates an instruction for reproduction in step S405 in FIG. 4, in step S501, the CPU 106 reads stream data of the selected chapter from the disk 116 and displays an image of the reproduced moving image data on the display unit 110.

In step S502, the CPU 106 determines whether the user has operated the operation unit 109 to stop the reproduction. If it is determined in step S502 that the user has operated the operation unit 109 to stop the reproduction (YES in step S502) in the state where the image of the reproduced moving image data is displayed on the display unit 110 in step S501, then processing advances to step S511. In step S511, the CPU 106 stops reading the stream data from the disk 116, and then processing returns to step S401 in FIG. 4. That is, in the present exemplary embodiment, when the reproduction of moving image data is stopped, a representative image list screen is displayed on the display unit 110.

On the other hand, if it is determined in step S502 that the user has not operated the operation unit 109 to stop the reproduction (NO in step S502), then processing advances to step S503. In step S503, the CPU 106 determines whether the currently reproduced chapter has been read to the end of the chapter.

If it is determined in step S503 that the currently reproduced chapter has not been read to the end of the chapter (NO in step S503), then processing returns to step S501. On the other hand, if it is determined in step S503 that the currently reproduced chapter has been read to the end of the chapter (YES in step S503), then processing advances to step S504. In step S504, the CPU 106 determines whether a chapter to be reproduced next exists. In the present exemplary embodiment, unless the user generates an instruction for stopping the reproduction, after one chapter is reproduced to the end of the chapter, stream data of the next chapter is subsequently reproduced in the order of chapter number.

If it is determined in step S504 that no chapter to be reproduced next exists (NO in step S504), then processing advances to step S511. In step S511, the CPU 106 stops the reproduction. On the other hand, if it is determined in step S504 that a chapter to be reproduced next exists (YES in step S504), then processing advances to step S505. In step S505, the CPU 106 determines whether representative image data of the next chapter is stored on the representative image memory 115.

If it is determined in step S505 that the representative image data of the next chapter is not stored on the representative image memory 115 (NO in step S505), then processing advances to step S506. In step S506, the CPU 106 determines whether a free space exists in the representative image memory 115.

If it is determined in step S506 that no free space exists in the representative image memory 115 (NO in step S506), then processing advances to step S510. In step S510, the CPU 106 deletes representative image data of a chapter whose chapter number is most distant from the chapter number of the currently selected chapter with respect to the order of reproduction, of the representative images stored on the representative image memory 115, and then processing advances to step S507.

On the other hand, if it is determined in step S506 that a free space exists in the representative image memory 115 (YES in step S506), then processing advances to step S507.

In step S507, the CPU 106 reproduces stream data of the next chapter from the disk 116 and decodes the moving image data to display an image of the decoded moving image data on the display unit 110. In step S508, the CPU 106 generates representative image data using the first picture of the next chapter from the reproduced moving image data, and then processing advances to step S509. In step S509, the CPU 106 stores the generated representative image data on the representative image memory 115.

Then, processing returns to step S501 to continue the reproduction of the stream data of the currently reproduced chapter.

On the other hand, if it is determined in step S505 that representative image data of the next chapter is already stored on the representative image memory 115 (YES in step S505), then processing returns to step S501 to reproduce stream data of the next chapter from the disk 116.

Figure 6:
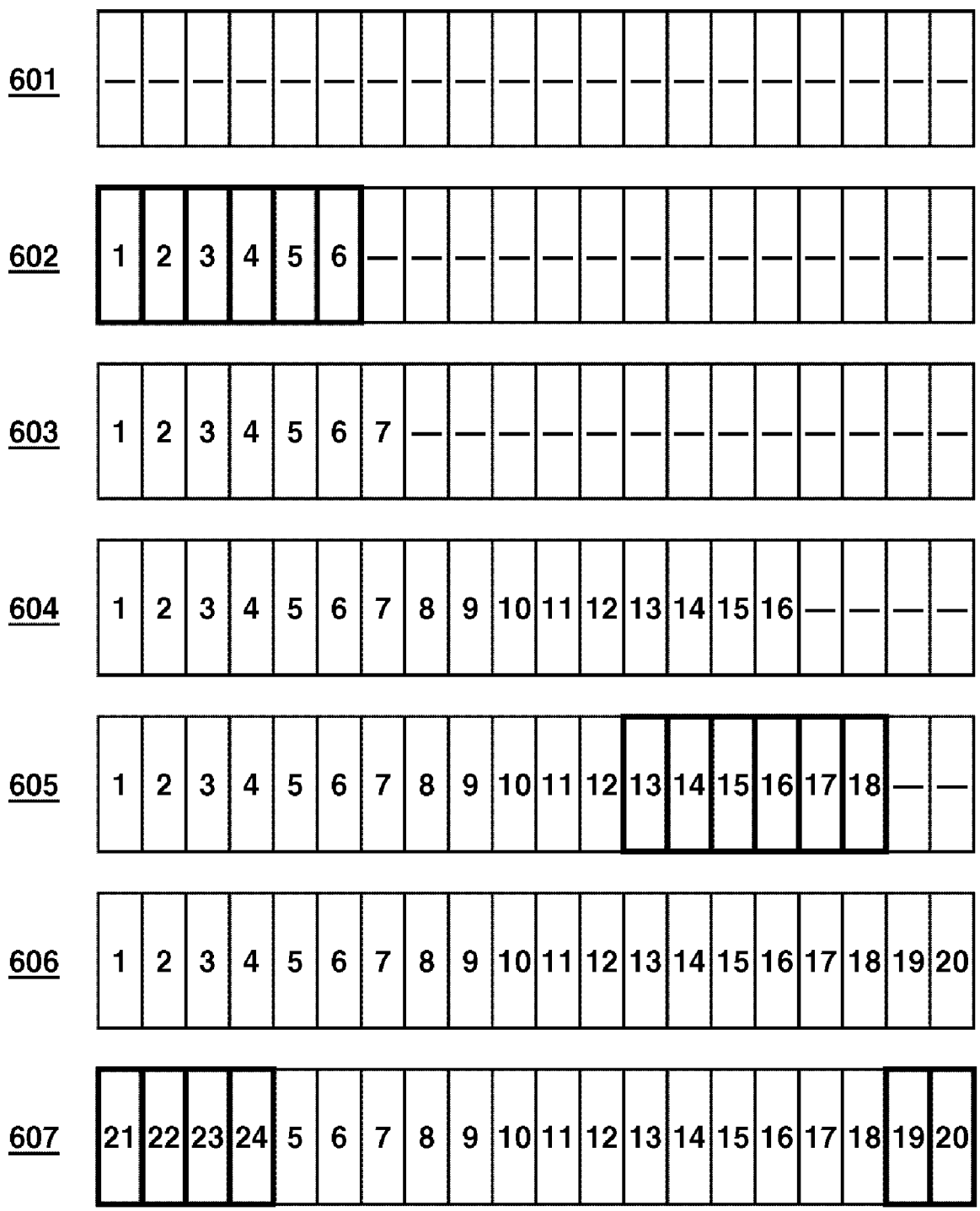
FIG. 6 illustrates data stored on a representative image memory according to an exemplary embodiment of the present invention.

FIG. 6 illustrates an example of representative image data stored on the representative image memory 115 according to an exemplary embodiment.

In the example illustrated in FIG. 6, fifty chapters including chapters 1 through 50 are recorded on the disk 116.

Referring to FIG. 6, each number stands for a chapter number of the representative image data stored on the representative image memory 115. A portion surrounded by a bold rectangle indicates the representative image data displayed on a representative image list screen. An area indicated with a dash does not include representative image data.

As described above, when a representative image list screen is displayed for the first time after the disk 116 is mounted or after the DVD video camera 100 is powered on, no representative image data is stored on the representative image memory 115, as indicated with a state 601.

Accordingly, in the state 601, the CPU 106 is in a process of generating new representative image data to be displayed as a list. In FIG. 6, as indicated with a state 602, the CPU 106 has generated representative image data for six chapters from the top, namely, chapters 1 through 6, and stored all the generated representative image data on the representative image memory 115.

Suppose here that the chapter 3 is selected and the reproduction of the chapter 3 is started. Subsequently, when the chapter 3 is reproduced to the end of the chapter, the reproduction of subsequent chapters starts in the order of the chapter number (in the order of chapter 4, chapter 5, chapter 6, . . . ).

With respect to the chapters 4 through 6, the CPU 106 has already generated representative image data and stored the generated representative image data on the representative image memory 115 at the start of reproduction. Accordingly, the representative image data stored on the representative image memory 115 do not change.

At the time the chapter 6 is reproduced to the end of the chapter and the reproduction of the chapter 7 starts, representative image data of the chapter 7 is not yet stored on the representative image memory 115. Accordingly, when the stream data of the chapter 7 is reproduced from the disk 116, the CPU 106 generates representative image data using the first picture of the chapter 7. Then, as indicated with a state 603, the CPU 106 stores the generated representative image data on the representative image memory 115. Then, just as described above, when the reproduction processing is continued to reproduce the subsequent chapters (chapters 8, 9, and 10), the CPU 106 generates representative image data of each of the chapters 8, 9, and 10, and then stores the generated representative image data on the representative image memory 115.

When the reproduction processing is continued and the reproduction of the chapter 16 starts and when the user generates an instruction for stopping the reproduction in this state, the CPU 106 causes the display unit 110 to display a representative image list screen. In this case, representative images of the chapters 13 through 18 are displayed as a list. At this time, representative image data of the chapters 13 through 16 is already stored on the representative image memory 115, as indicated with a state 604.

However, at this time also, representative image data of the chapters 17 and 18 are not yet stored on the representative image memory 115 yet. Accordingly, the CPU 106 reproduces stream data of the chapters 17 and 18 from the disk 116, generates new representative image data, and stores the generated representative image data on the representative image memory 115, as indicated with a state 605.

As described above, the representative image list screen is displayed on the display unit 110, displaying the representative image data of the chapters 13 through 18 stored on the representative image memory 115.

When the reproduction starts again with the chapter 18, the CPU 106, at the time the reproduction processing advances to the reproduction of the chapters 19 and 20, generates representative image data of each chapter, and then stores the generated representative image data on the representative image memory 115. As indicated with a state 606, when representative image data of the chapter 20 is stored on the representative image memory 115, the capacity of the representative image memory 115 is fully used.

When the reproduction processing further advances to reproduce the chapter 21, the CPU 106 deletes the representative image data of the chapter 1, which is most distant from the current reproduction position with respect to the reproduction order, from the representative image memory 115. Then, the CPU 106 generates representative image data of the chapter 21 and stores the generated representative image data on the representative image memory 115.

When the user generates an instruction for stopping the reproduction during the reproduction of the chapter 21, representative images of the chapters 19 through 24 are displayed as a list.

At this time, the representative image data of the chapters 19 through 21 has already been stored on the representative image memory 115. Accordingly, it is not necessary for the CPU 106 to generate representative image data for the chapters 19 through 21 at this time.

Then, the CPU 106 newly generates representative image data of the chapters 22 through 24 and stores the generated representative image data on the representative image memory 115. At this time, the capacity of the representative image memory 115 is fully used. Accordingly, as indicated with a state 607, the CPU 106 deletes the representative image data of the chapters 2 through 4, which are most distant from the chapter currently displayed as a list, from the representative image memory 115.

As described above, in an exemplary embodiment, in serially reproducing stream data of a plurality of chapters from the disk 116, the CPU 106 generates representative image data of a chapter to be reproduced next and stores the generated representative image data on the representative image memory 115 each time the reproduction processing advances to a next chapter to be displayed.

Thus, in accordance with an embodiment, with respect to a chapter that has already been reproduced, it is not necessary, in displaying a list of representative images, to newly generate representative image data. Accordingly, the representative image list screen can be immediately displayed.

In an exemplary embodiment, during normal reproduction started according to a user instruction for starting reproduction, the CPU 106 generates representative image data using the already reproduced stream data and stores the generated representative image data on the representative image memory 115. Accordingly, at the time of displaying a representative image list screen, it is not necessary to generate representative image data.

In the above-described exemplary embodiment, the processing for reproducing a disk recorded according to the DVD-Video format is described. However, similar processing can be applied in the case of using a disk recorded according to the DVD VR format. In the case of using the DVD VR format, the above-described processing can be applied to the case of using an original program chain (PGC), and in addition, to the case of reproduction of a user defined PGC ("playlist").

Other Exemplary Embodiments

Each unit constituting the reproducing apparatus and each step of the reproduction method according to the exemplary embodiment of the present invention can be implemented by executing a computer-readable program stored on a random access memory (RAM) or a read-only memory (ROM) of a computer with a CPU of the computer. The program and a computer-readable recording (storage) medium storing the program are included in the present invention.

Embodiments of the present invention can be implemented in a system, an apparatus, a method, a program, or a storage medium storing the program, for example. More specifically, the present invention can be applied to a system including a plurality of devices and to an apparatus that includes one device.

Embodiments of the present invention can be implemented by directly or remotely supplying a program of software implementing functions of the above-described exemplary embodiments (in the exemplary embodiments, the program corresponding to the processing performed according to the flow charts in FIG. 4 and FIG. 5) to a system or an apparatus and reading and executing supplied program code with a computer of the system or the apparatus.

Accordingly, the program code itself, which is installed on the computer for implementing the functional processing of the present invention with the computer, implements the present invention. That is, the present invention also includes the computer program implementing the functional processing of the present invention.

Accordingly, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a DVD (a DVD-ROM and a DVD-R), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a World Wide Web (WWW) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing on the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-210174 filed Aug. 1, 2006, which is hereby incorporated by reference herein in its entirety.

What is claimed is:

1. An apparatus comprising:
a reproduction unit configured to reproduce moving image data from a recording medium on which moving image data of a plurality of scenes is recorded;
a display unit configured to display a moving image of the moving image data reproduced by the reproduction unit;
a representative image generation unit configured to generate representative image data representing a representative image of the scene using the moving image data reproduced by the reproduction unit and to store the generated representative image data in a memory;
a list screen generation unit configured to generate a list screen for the representative images of the plurality of scenes using the representative image data stored in the memory;
an instruction unit configured to provide a normal reproduction instruction of the moving image data and a display instruction of the representative image; and
a control unit configured to control the reproduction unit to reproduce the moving image data of the plurality of scenes from the recording medium according to the normal reproduction instruction of the moving image data provided by the instruction unit and to control the list screen generation unit to generate the list screen according to the display instruction of the representative image provided by the instruction unit,
wherein the control unit controls the display unit so as to display the moving image of the moving image data reproduced by the reproduction unit according to the normal reproduction instruction of the moving image data provided by the instruction unit and to display the generated list screen generated by the list screen generation unit on the display device according to the display instruction of the representative image provided by the instruction unit, and
wherein the control unit controls the representative image generation unit so as to, if the moving image data reproduced by the reproduction unit changes to a new scene during reproduction of the moving image data according to the normal reproduction instruction of the moving image data provided by the instruction unit, automatically generate the representative image data of the new scene using the moving image data of the new scene reproduced by the reproducing unit and store the generated representative image data of the new scene in the memory.

2. The apparatus according to claim 1, wherein the representative image generation unit is configured to generate the representative image data using a first picture of a scene of the moving image data reproduced by the reproduction unit.

3. The apparatus according to claim 1, wherein the representative image generation unit is configured to, if a free space to store the generated representative image data does not exist in the memory, delete representative image data of a predetermined scene from the representative image data stored in the memory, and store the generated representative image data in the memory.

4. The apparatus according to claim 1, wherein the control unit is configured to determine whether representative image data to be displayed with the list screen is stored in the memory according to the display instruction of the representative image and, if it is determined that the representative image data to be displayed is not stored in the memory, to control the reproduction unit to reproduce moving image data of a scene corresponding to the representative image data to be displayed and to control the representative image generation unit to generate representative image data using the reproduced moving image data.

5. The according to claim 1, wherein the recording medium comprises a digital versatile disc (DVD) and the memory comprises a memory chip.

6. An apparatus comprising:
a reproduction unit configured to reproduce moving image data from a recording medium on which moving image data of a plurality of scenes is recorded;
a display unit configured to display a moving image of the moving image data reproduced by the reproduction unit;
a representative image generation unit configured to generate representative image data representing a representative image of the scene using the moving image data reproduced by the reproduction unit and to store the generated representative image data in a memory;
an instruction unit configured to provide a normal reproduction start instruction for starting normal reproduction of the moving image data, a reproduction stop instruction for stopping reproduction of the moving image data and a display instruction of the representative image;
a list screen generation unit configured to generate a list screen for the representative images of the plurality of scenes using the representative image data stored in the memory according to the display instruction of the representative image provided by the instruction unit; and
a control unit configured to control the reproduction unit so as to reproduce the moving image data from the recording medium according to the normal reproduction start instruction provided by the instruction unit and to stop reproducing the moving image data from the recording medium according to the reproduction stop instruction provided by the instruction unit,
wherein the control unit controls the display unit so as to display the moving image of the moving image data reproduced by the reproduction unit according to the normal reproduction start instruction provided by the instruction unit and to display the generated list screen generated by the list screen generation unit on the display device according to the display instruction of the representative image provided by the instruction unit, and wherein the control unit controls the representative image generation unit so as to automatically generate the representative image data using the moving image data reproduced by the reproducing unit during a time period from the normal reproduction start instruction provided by the instruction unit to the reproduction stop instruction provided by the instruction unit and store the generated representative image data in the memory.

7. The apparatus according to claim 6, wherein the control unit controls the representative image generation unit so as to automatically generate the representative image data of a new scene using the moving image data of the new scene reproduced by the reproducing unit if the moving image data reproduced by the reproduction unit is changed to the new scene.

8. The apparatus according to claim 6, wherein the representative image generation unit is configured to, if a free space to store the generated representative image data does not exist in the memory, delete representative image data of a predetermined scene from the representative image data stored in the memory, and store the generated representative image data in the memory.

9. The apparatus according to claim 6, wherein the control unit determines whether representative image data to be displayed with the list screen is stored in the memory according to the display instruction of the representative image, and, if it is determined that the representative image data to be displayed is not stored in the memory, to control the reproduction unit to reproduce moving image data of a scene corresponding to the representative image data to be displayed and to control the representative image generation unit to generate representative image data using the reproduced moving image data.

10. The apparatus according to claim 6, wherein the instruction unit provides the normal reproduction instruction of the moving image data of selected one representative image from the plurality of representative images displayed on the list screen.

11. A method for controlling an apparatus comprising a reproduction unit configured to reproduce moving image data from a recording medium on which moving image data of a plurality of scenes is recorded, a display unit configured to display a moving image of the moving image data reproduced by the reproduction unit, a representative image generation unit configured to generate representative image data representing a representative image of the scene using the moving image data reproduced by the reproduction unit and to store the generated representative image data in a memory, a list screen generation unit configured to generate a list screen for the representative images of the plurality of scenes using the representative image data stored in the memory and an instruction unit configured to provide a normal reproduction instruction of the moving image data, and a display instruction of the representative image, the method comprising:

a step of controlling the reproduction unit to reproduce the moving image data of the plurality of scenes from the recording medium according to the normal reproduction instruction of the moving image data provided by the instruction unit;

a step of controlling the list screen generation unit so as to generate the list screen according to the display instruction of the representative image provided by the instruction unit;

a step of controlling the display unit so as to display the moving image of the moving image data reproduced by the reproduction unit according to the normal reproduction instruction of the moving image data provided by the instruction unit and to display the generated list screen generated by the list screen generation unit on the display device according to the display instruction of the representative image provided by the instruction unit; and a step of controlling the representative image generation unit so as to, if the moving image data reproduced by the reproduction unit is changed to a new scene during reproduction of the moving image data according to the normal reproduction instruction of the moving image data provided by the instruction unit, automatically generate the representative image data of the new scene using the moving image data of the new scene reproduced by the reproducing unit.

* * * * *